(12) United States Patent
Zhang

(10) Patent No.: US 11,802,503 B2
(45) Date of Patent: Oct. 31, 2023

(54) OPTIMIZING AN SCR CATALYTIC CONVERTER STATE WHEN PARKING A VEHICLE WITH A DIESEL ENGINE

(71) Applicant: Vitesco Technologies GmbH, Regensburg (DE)

(72) Inventor: Hong Zhang, Tegernheim (DE)

(73) Assignee: VitescoTechnologies GmbH, Regensburg (DE)

( * ) Notice: Subject to any disclaimer, the term of this patent is extended or adjusted under 35 U.S.C. 154(b) by 0 days.

(21) Appl. No.: 17/806,482

(22) Filed: Jun. 11, 2022

(65) Prior Publication Data
US 2022/0298944 A1   Sep. 22, 2022

Related U.S. Application Data

(63) Continuation of application No. PCT/EP2020/082508, filed on Nov. 18, 2020.

(30) Foreign Application Priority Data

Dec. 13, 2019 (DE) .................... 10 2019 219 553.9

(51) Int. Cl.
*F01N 3/20* (2006.01)

(52) U.S. Cl.
CPC ........ *F01N 3/208* (2013.01); *F01N 2560/021* (2013.01); *F01N 2610/02* (2013.01);
(Continued)

(58) Field of Classification Search
CPC ............... F01N 3/208; F01N 2560/021; F01N 2610/02; F01N 2610/1406;
(Continued)

(56) References Cited

U.S. PATENT DOCUMENTS

| 2010/0268438 A1 | 10/2010 | Hiranuma et al. |
| 2011/0061370 A1* | 3/2011 | Aoyama ............ B01D 53/9495 60/285 |

(Continued)

FOREIGN PATENT DOCUMENTS

| DE | 102014212741 A1 | 1/2015 |
| EP | 2210788 A1 | 7/2010 |
| EP | 2256311 A1 | 12/2010 |
| EP | 2754871 A1 | 7/2014 |
| EP | 3557016 A1 | 10/2019 |

OTHER PUBLICATIONS

International Search Report and Written Opinion dated Jan. 27, 2021 from corresponding International Patent Application No. PCT/EP2020/082508.

(Continued)

*Primary Examiner* — Brandon D Lee

(57) ABSTRACT

The disclosure relates to a method for optimizing the state of a catalytic converter in a vehicle with a diesel engine when parking the vehicle, the method comprising establishing that a switch-off process for switching off the diesel engine has been initiated, increasing an NH3 feed rate to a first value in order to store a surplus of NH3 in the catalytic converter, stopping the NH3 feed when the speed of the diesel engine falls below a speed threshold or a measured NH3 emission exceeds an emission threshold, and completing the switch-off process. The disclosure also relates to an engine controller and to a computer program.

9 Claims, 1 Drawing Sheet

(52) U.S. Cl.
CPC .......................... *F01N 2610/1406* (2013.01); *F01N 2610/146* (2013.01); *F01N 2900/08* (2013.01); *F01N 2900/1622* (2013.01); *F01N 2900/1812* (2013.01)

(58) Field of Classification Search
CPC ........... F01N 2610/146; F01N 2900/08; F01N 2900/1622; F01N 2900/1812; F01N 2900/1402; F01N 9/00; F02D 41/0235; F02D 41/042; F02D 41/08; Y02T 10/12; Y02T 10/40; Y02A 50/20
See application file for complete search history.

(56) References Cited

U.S. PATENT DOCUMENTS

| | | | |
|---|---|---|---|
| 2014/0013726 A1* | 1/2014 | Yacoub | F01N 3/32 60/274 |
| 2014/0182273 A1* | 7/2014 | Lack | F02D 41/0235 422/111 |
| 2015/0013309 A1* | 1/2015 | Upadhyay | F01N 3/208 60/274 |
| 2018/0258873 A1* | 9/2018 | Haas | F01N 9/00 |

OTHER PUBLICATIONS

German Office Action dated Sep. 18, 2020 for corresponding German Patent Application No. 10 2019 219 553.9.

\* cited by examiner

OPTIMIZING AN SCR CATALYTIC CONVERTER STATE WHEN PARKING A VEHICLE WITH A DIESEL ENGINE

CROSS-REFERENCE TO RELATED APPLICATIONS

This application claims the benefit of PCT Application PCT/EP2020/082508, filed Nov. 18, 2020, which claims priority to German Application 10 2019 219 553.9, filed Dec. 13, 2019. The disclosures of the above applications are incorporated herein by reference.

TECHNICAL FIELD

The disclosure relates to the technical field of exhaust aftertreatment by a catalytic converter in diesel engines. More specifically, the disclosure relates to a method for optimizing the state of a catalytic converter in a vehicle with a diesel engine when parking the vehicle. The disclosure also relates to an engine controller and to a computer program.

BACKGROUND

Adjusting the NH3 storage state in the catalytic converter (SCR or SDPF catalytic converter, where SCR denotes selective catalytic reduction and SDPF denotes selective catalytic reduction with a diesel particulate filter) while the engine is running depending on the current temperature of the catalytic converter is known. The higher the temperature of the catalytic converter, the lower the storage state, so that NH3 does not break through the catalytic converter. Since the storage state is transferred only slowly toward the target value (duration over 100 seconds), it can happen that the storage state does not reach its target value if the engine is stopped suddenly. In addition, the target value while the engine is operating does not necessarily correspond to the target value for the next engine start. The latter target value is high so that, at the next engine start, especially with a cold exhaust system, the stored NH3 contributes to the conversion of NOx during the warm-up phase of the catalytic converter.

SUMMARY

The disclosure provides an optimal state, such as an optimal NH3 storage state of the catalytic converter for the next engine start.

A first aspect of the disclosure provides a method for optimizing the state of a catalytic converter in a vehicle with a diesel engine when parking the vehicle. The described method includes the following steps: (a) establishing that a switch-off process for switching off the diesel engine has been initiated; (b) increasing an NH3 feed rate to a first value in order to store a surplus of NH3 in the catalytic converter; (c) stopping the NH3 feed when the speed of the diesel engine falls below a speed threshold or a measured NH3 emission exceeds an emission threshold; and (d) completing the switch-off process.

The described method is based on the finding that increasing the NH3 feed rate in conjunction with switching off the engine leads to a considerably increased stored amount of NH3 in the catalytic converter, which is then available for the later cold start of the engine. The (increased) NH3 feed is stopped when the engine speed becomes low (below a speed threshold) (and the exhaust stream through the catalytic converter correspondingly decreases) or when an emission threshold is exceeded (which indicates that additional storage of NH3 in the catalytic converter is not possible). It is thus ensured that efficient storage of NH3 in the catalytic converter takes place without undesirably high NH3 emissions being discharged with the exhaust gas.

The start of a switch-off process is established, for example, by detecting an engine stop command (key off), which is initiated by corresponding operation of the vehicle key or of the on/off button by the driver. The NH3 feed rate, that is to say the amount of NH3 fed per unit time (g/s), is increased, for example, by increasing the dose of urea solution in the exhaust aftertreatment system. The first value is greater than the desired value corresponding to the current operating state of the diesel engine and thus leads (as far as possible) to increased storage of NH3 in the catalytic converter. The NH3 feed is stopped or terminated when the engine speed becomes low or when the measured NH3 emission in the exhaust gas becomes too high, whichever occurs first. In both cases, it is not worthwhile to feed further NH3 because it cannot be stored in the catalytic converter and in addition can lead to undesirable emissions. The switch-off process is then completed, and the vehicle remains stationary until the next engine start.

The method can be integrated into the engine controller of any diesel engine without additional hardware by adapting the controller of the AdBlue dosing based on immediately available data.

In some examples, the first value corresponds to a maximum NH3 feed rate.

In other words, urea solution is dosed in as large an amount as the system will allow. This leads to the maximum possible amount of NH3 being stored in the catalytic converter within the relatively short time available, that is to say during switching off of the diesel engine.

In some implementation, the speed threshold is between 100 and 300, for example, about 200 revolutions per minute.

In some examples, the measured NH3 emission is detected by an emission sensor which is mounted in the exhaust system of the vehicle downstream of the catalytic converter.

The emission sensor may be mounted at the outlet of the catalytic converter. Alternatively, the emission sensor may be mounted after an ammonia slip catalytic converter (ASC) which is mounted downstream of the SCR/SDPF catalytic converter.

In some implementations, the emission threshold is between 30 and 50, for example, about 40 ppm NH3.

In some examples, the method furthermore includes the following steps, which are performed before establishing that a switch-off process has been initiated: (a) establishing that the diesel engine is in an idling state, and (b) increasing the NH3 feed rate to a second value in order to store a surplus of NH3 in the catalytic converter.

The disclosure advantageously makes use of the fact that the switch-off process is in most cases preceded by an idling phase, by increasing the NH3 feed rate as soon as the idling state is detected. If a switch-off process is subsequently actually initiated, the NH3 storage state of the catalytic converter has already been increased slightly, and the probability that an optimal storage state will be reached in the course of the switch-off process is thus correspondingly improved.

In some examples, the second value is less than or equal to the first value.

Since it is not certain that the idling phase will be followed by a switch-off process, it can be advantageous to choose the second value (and thus the increase in the NH3 feed) to be slightly less than the first value.

In some implementations, the method furthermore includes reducing the NH3 feed rate from the second value to a lower value when the measured NH3 emission exceeds the emission threshold.

In other words, increased emission of NH3 is avoided also when idling.

In some examples, the method furthermore includes reducing the NH3 feed rate from the second value to a lower value corresponding to the operating state of the diesel engine when the diesel engine leaves the idling state.

In other words, the NH3 feed rate is adapted to the actual operating state of the diesel engine when the engine leaves the idling state.

A second aspect of the disclosure provides an engine controller which is configured to perform the method according to the first aspect of the disclosure.

This engine controller is based substantially on the same idea as the above-described method according to the first aspect and allows this method to be implemented in a vehicle with a diesel engine and an SCR catalytic converter.

A third aspect of the disclosure describes a computer program with computer-executable commands which, when they are executed by a processor, are configured to perform the method according to the first aspect and/or one of the above examples.

Within the meaning of this document, the designation of a computer program of this kind is equivalent to the concept of a program element, a computer program product and/or a computer-readable medium which contains instructions for controlling a computer system, in order to coordinate the manner of operation of a system or of a method in a suitable manner, in order to achieve the effects associated with the method according to the disclosure.

The computer program can be implemented as a computer-readable instruction code in any suitable programming language, such as in JAVA, C++, etc. for example. The computer program can be stored on a computer-readable storage medium (CD-ROM, DVD, Blu-ray disk, removable drive, volatile or non-volatile memory, integral memory/processor, etc.). The instruction code can program a computer or other programmable devices, such as a control device for an engine of a motor vehicle for example, in such a way that the desired functions are executed. Furthermore, the computer program may be provided in a network such as, for example, the Internet, from which a user can download it as required.

The disclosure may be implemented both by way of a computer program, i.e. software, and by way of one or more specific electrical circuits, i.e. as hardware or in any desired hybrid form, i.e. by way of software components and hardware components.

It should be noted that embodiments of the disclosure have been described with reference to different subjects of the disclosure. For example, some examples of the disclosure are described by way of method claims and other examples of the disclosure are described by way of device claims. However, it will become immediately clear to a person skilled in the art on reading this application that, unless explicitly stated otherwise, in addition to a combination of features which are associated with one type of subject of the disclosure, any combination of features which are associated with different types of subjects of the disclosure is also possible.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
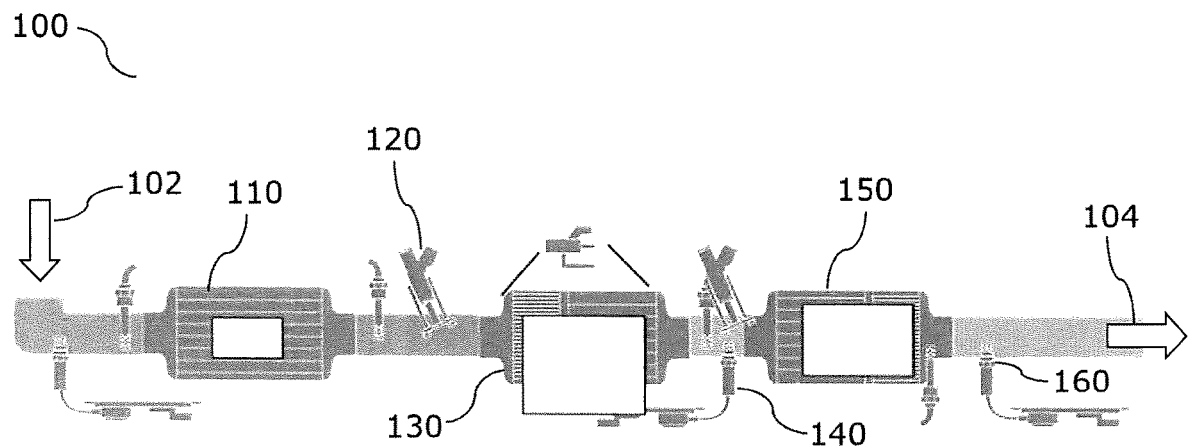
FIG. 1 shows a construction of an exemplary exhaust aftertreatment system with a catalytic converter.

FIG. 1 shows the construction of an exhaust aftertreatment system 100 with a catalytic converter. The exhaust aftertreatment system 100 includes a diesel oxidation catalytic converter (DOC) 110, a feed 120 for a urea solution, an SCR or SDPF catalytic converter 130 (SCR=selective catalytic reduction, SDPF=SCR with a diesel particulate filter), a (first) emission sensor 140, an ammonia slip catalytic converter 150 (ASC) and a (second) emission sensor 160, which are mounted in the mentioned order in the direction of the exhaust stream between arrow 102 (inlet) and arrow 104 (outlet). Via the urea solution feed 120, the NH3, or ammonia, needed for the functioning of the SCR catalytic converter 130 is mixed with the exhaust stream, where a portion of the NH3 can also be stored in the porous structure of the catalytic converter 130. The disclosure ensures that the amount of NH3 stored in the catalytic converter 130 on cold start is as large as possible. This is achieved with the method described below, which (optionally in the form of a computer program) can be implemented directly into an engine controller.

Figure 2:
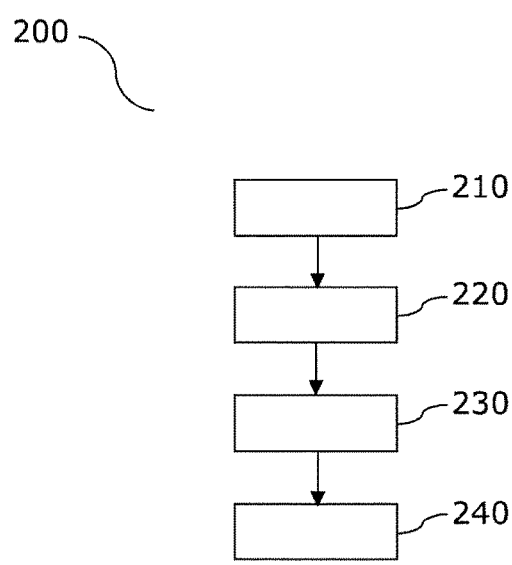
FIG. 2 is a block diagram of an exemplary method for optimizing the state of a catalytic converter in a vehicle with a diesel engine when parking the vehicle.

FIG. 2 is a block diagram of a method 200 for optimizing the state of a catalytic converter, for example, the SCR/SDPF catalytic converter 130 shown in FIG. 1, in a vehicle with a diesel engine when parking the vehicle.

At block 210 it is established that a switch-off process for switching off the diesel engine has been initiated, for example by operation of the vehicle key or of the on/off button by the driver.

In response thereto, at block 220 the NH3 feed rate is increased to a first value in order to store a surplus of NH3 in the catalytic converter 130. The first value may correspond to a maximum dose of urea solution via the urea solution feed 120.

At block 230 the NH3 feed is stopped when the speed of the diesel engine falls below a speed threshold or a measured NH3 emission exceeds an emission threshold. In other words, the high dose of urea solution is carried out for as long as possible, i.e. until either the speed becomes low (for example, 200 revolutions/minute) or the ammonia emission measured (for example, with the first emission sensor 140, alternatively with the second emission sensor 160) becomes so high (for example over 40 ppm) that it indicates NH3 breakthrough in the catalytic converter 130.

At block 240 the switch-off process is completed.

In a typical switch-off process, the time from the key-off command to reaching the speed threshold is from 1 to 2 seconds. Within this time, with maximum dosing, a total of approximately from 2 to 4 grams of urea solution (with 33% NH3 content) can be injected, which leads to the additional storage of about 0.7 to 1.3 grams of NH3 in the catalytic converter 130. This additional amount of NH3 then helps to increase the SCR conversion efficiency after the next cold start during the SCR warm-up phase and also thereafter due to the NH3 previously stored in the SCR catalytic converter.

A further optimization may be achieved by significantly increasing the NH3 dose also in a (in particular each) idling phase. Use is thereby made of the fact that most key-off commands are delivered when the engine is idling. Thus, the amount of NH3 stored in the catalytic converter is already increased in such cases when the key-off command is detected. After this command has been detected, as much additional NH3 as possible is stored in the catalytic converter 130 as described above. The measured NH3 emission is also monitored when idling and the increased feed of urea solution is stopped or reduced when the measured emission exceeds a threshold, for example 40 ppm. When normal driving is continued, the dose of urea solution is returned to normal, that is to say corresponding to the operating state of the diesel engine, at the end of the idling phase.

A number of implementations have been described. Nevertheless, it will be understood that various modifications may be made without departing from the spirit and scope of the disclosure. Accordingly, other implementations are within the scope of the following claims.

What is claimed is:

1. A method for optimizing a state of a catalytic converter in a vehicle with a diesel engine when parking the vehicle, the method comprising:
    determining when a switch-off operation for switching off the diesel engine has been initiated;
    increasing an NH3 feed rate to a first value in order to store a surplus of NH3 in the catalytic converter;
    receiving a measured NH3 emission;
    determining a speed of the diesel engine;
    stopping the NH3 feed when the speed of the diesel engine falls below a speed threshold or the measured NH3 emission exceeds an emission threshold;
    completing the switch-off operation; and
    before determining when the switch-off operation has been initiated:
        determining when the diesel engine is in an idling state, and
        increasing the NH3 feed rate to a second value to increase the surplus of the NH3 in the catalytic converter before increasing the NH3 feed rate to the first value.

2. The method of claim 1, wherein the first value corresponds to a maximum NH3 feed rate.

3. The method of claim 1, wherein the speed threshold is between 100 and 300 revolutions per minute.

4. The method of claim 1, wherein the measured NH3 emission is detected by an emission sensor mounted in an exhaust system of the vehicle downstream of the catalytic converter.

5. The method of claim 1, wherein the emission threshold is between 30 and 50 ppm NH3.

6. The method of claim 1, wherein the second value is less than or equal to the first value.

7. The method of claim 1, furthermore comprising:
    reducing the NH3 feed rate from the second value to a lower value when the measured NH3 emission exceeds the emission threshold.

8. The method of claim 1, furthermore comprising:
    reducing the NH3 feed rate from the second value to a lower value corresponding to an operating state of the diesel engine when the diesel engine leaves the idling state.

9. An engine controller for a diesel engine, wherein the engine controller is configured to perform a method for optimizing a state of a catalytic converter in a vehicle with a diesel engine when parking the vehicle, the method comprising:
    determining when a switch-off operation for switching off the diesel engine has been initiated;
    receiving a measured NH3 emission;
    determining a speed of the diesel engine;
    increasing an NH3 feed rate to a first value in order to store a surplus of NH3 in the catalytic converter;
    stopping the NH3 feed when the speed of the diesel engine falls below a speed threshold or the measured NH3 emission exceeds an emission threshold; and
    completing the switch-off operation
    before determining when the switch-off operation has been initiated:
        determining when the diesel engine is in an idling state, and
        increasing the NH3 feed rate to a second value to increase the surplus of the NH3 in the catalytic converter before increasing the NH3 feed rate to the first value.

* * * * *